United States Patent Office 2,751,405
Patented June 19, 1956

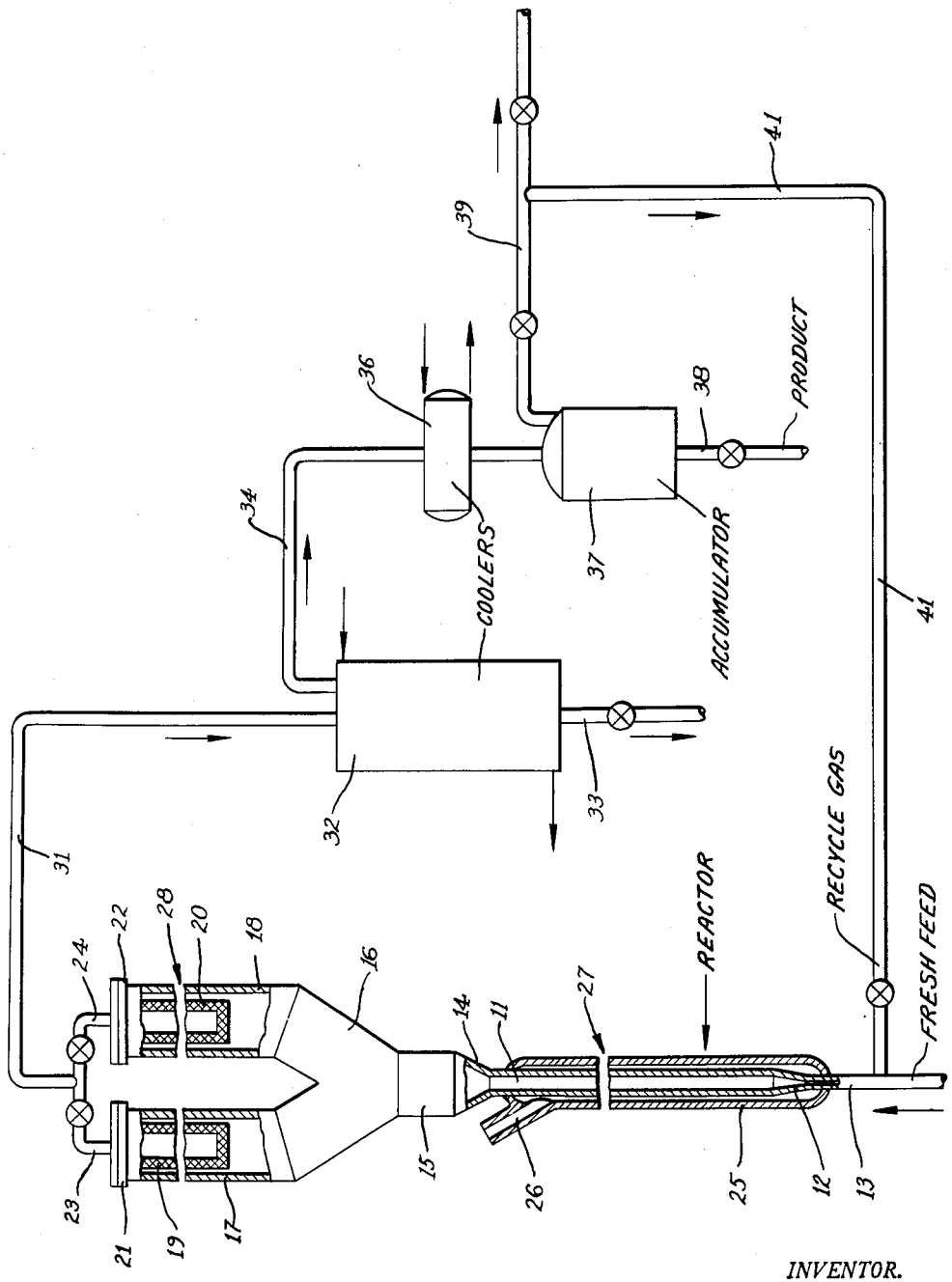

2,751,405

SYNTHESIS OF ORGANIC COMPOUNDS FROM CARBON MONOXIDE AND HYDROGEN

Henry G. McGrath, Union, and Louis C. Rubin, West Caldwell, N. J., assignors to The M. W. Kellogg Company, Jersey City, N. J., a corporation of Delaware Application April 9, 1951, Serial No. 220,050

1 Claim. (Cl. 260—449.6)

This invention relates to an improved method for hydrogenating carbon oxides to produce hydrocarbons and oxygenated organic compounds. Primarily the improved process involves reacting hydrogen and carbon monoxide under highly efficient conditions to produce hydrocarbons and oxygenated organic compounds under which conditions the major proportion of the oxygen of the carbon oxide is converted to water rather than carbon dioxide. The improved process is applicable also in reacting hydrogen with organic compounds containing the carbonyl group, and herein designated generally as "carbon oxide reactants," whose reaction with hydrogen is promoted by the catalysts which are effective with carbon monoxide, such as ketones, aldehydes, acyl halides, organic acids and their salts and esters, acid anhydrides, and amines. In the following description of the invention the hydrogenation of carbon monoxide will be referred to specifically. It will be understood, however, that the invention is of wider application, including within its scope the hydrogenation of any suitable carbon oxide.

This application is a continuation-in-part of my prior and copending applications Serial No. 690,820, filed August 15, 1946, and Serial No. 729,878, filed February 20, 1947, both now abandoned.

The improved process involves flowing a gaseous mixture comprising hydrogen and the carbon oxide to be hydrogenated upwardly in a reaction zone containing a mass of finely divided metal catalyst for the reaction. The hydrogen and carbon oxide reactant are passed in the gas form through the reaction zone, under conditions effective to react all, or a major proportion, of the carbon oxide reactant, at a charging rate, in relation to the quantity of catalyst in the reaction zone, which is much higher than the charging rates previously employed in similar operations. The gaseous mixture is passed upwardly through the mass of catalyst at a velocity effective to suspend or entrain the catalyst mass in the gas stream. The velocity of the gas stream passing through the reaction zone, however, is preferably sufficiently low to maintain the catalyst mass in a dense, fluidized, pseudo-liquid condition. In this condition the catalyst mass may be said to be suspended in the gas stream, but not entrained therein in the sense that there is movement of the catalyst mass as such in the direction of flow of the gas stream. It is preferred, however, to maintain the upward velocity of the gas stream sufficiently high to maintain the fluidized catalyst mass in a highly turbulent condition in which the catalyst particles circulate at a high rate in the pseudo-liquid mass. In this preferred condition of operation a small proportion of catalyst in the fluidized mass may become entrained in the gas stream emerging from the upper surface of the fluidized mass whereby catalyst thus entrained is carried away from the mass.

In the improved process the hydrogen and carbon oxide are employed in ratios such that there is a substantial excess of hydrogen. The charging rate in the improved process is defined by reference to the rate at which the total gaseous feed is charged, in terms of standard cubic feet, in the gas form, per hour, per pound of the metal catalyst in the reaction zone. The improved process is operated at a minimum space velocity equivalent to charging at least 30 standard cubic feet of total gaseous feed, per hour, per pound of the metal catalyst in the catalyst phase of the reactor. A standard cubic foot of gas is that quantity of normally gaseous components which would occupy one cubic foot at atmospheric pressure and 60° F., or an equivalent quantity of normally liquid feed components. When reacting carbon monoxide it is preferred to employ still higher space velocities, as will be described in more detail below.

The catalyst employed in the present invention is a finely divided powder consisting essentially of an iron, or iron oxide, which is, or becomes in the reaction zone, a catalyst for the reaction, or a mixture of such iron and iron oxide catalytic materials. While the catalyst powder consists essentially of such catalytic iron and iron oxides it may include also a minor amount of promoting ingredients, such as alkalies, alumina, silica, titania, thoria, manganese oxide, magnesia, etc. In the following description and claim, catalyst powders consisting of a metal and/or a metal oxide and containing at most a minor proportion of promoter are referred to as "finely divided metal catalyst."

The exact chemical condition of the catalyst in its most active form is not certain. It may be that the active form is present when the metal is in an optimum degree of oxidation or carburization. Consequently, the powdered catalyst which is in a substantially completely reduced condition when first contacted with the reactants, may reach its state of highest activity through being oxidized and/or carburized in the reaction zone. Therefore, in this specification and claim the catalyst employed is described by reference to its chemical condition when first contacted with the reactants.

The catalyst is employed in a fine state of subdivision. Preferably the powdered catalyst initially contains no more than a minor proportion by weight of material whose particle size is greater than 250 microns. Preferably also the greater proportion of the catalyst mass comprises material whose particle size is smaller than 100 microns, including at least 25 weight per cent of the material in particle sizes smaller than 37 microns. A highly desirable powdered catalyst comprises at least 75 per cent by weight of material smaller than 150 microns in particle size, and at least 25 per cent by weight smaller than 37 microns in particle size.

In the preferred form of the invention the powdered catalyst mass is maintained in a reactor substantially larger than the volume occupied by the catalyst mass in the fluidized condition. In this operation all but a minor proportion of the catalyst mass is contained in the dense fluidized pseudo-liquid mass, which may be designated as the dense phase of the catalyst. The dense phase of the catalyst occupies the lower part of the reactor while that part of the reactor above the dense phase is occupied by a mixture of gases and powdered catalyst in which the concentration of catalyst is much lower, and of a different order of magnitude, than the concentration of the catalyst in the dense phase. This diffuse phase may be said to be a disengaging zone in which the solids lifted above the dense phase by the gas stream are disengaged therefrom and returned to the dense phase to the extent that such solids are present in the diffuse phase in excess of the carrying capacity of the gas stream at the superficial velocity of the gas stream. The latter is the velocity at which the gas stream would flow through the reactor in the absence of catalyst. In the dense phase the concentration of the catalyst in the gas stream varies from a maximum near the gas inlet to a minimum in the upper part of this phase. Likewise the concentration of catalyst in the diffuse phase varies from a maximum near the upper surface of the dense phase to a minimum in the upper part of the reactor. Between the dense phase of high average concentration and the diffuse phase of low average concentration there is a relatively narrow zone in which the concentration of solids in the gas stream changes in a short space from the high concentration of the dense phase to the low concentration of the diffuse phase. This zone has the appearance of an interface between two visually distinct phases.

As the improved method of operation ordinarily involves employment of catalyst powders and gas velocities such that a portion of the dense fluidized catalyst mass is carried away by entrainment, it is necessary to provide means in the reactor for separating such entrained catalyst and returning it to the dense phase, or to provide means externally of the reactor to separate entrained catalyst from the gas stream and return it to the reactor, or otherwise to recover catalyst from the product gas stream. When catalyst is permitted to pass out of the reactor in entrainment in the gas stream it is necessary to return such catalyst to the reactor, or replace it with fresh or revivified catalyst, in order to maintain the desired volume of fluidized catalyst in the reaction zone.

The improved method of operation, in which the finely powdered catalyst is employed in a form consisting of the metal catalyst, or its oxide, and containing at most minor proportions of promoting agents, provides very high catalyst concentrations in the reaction zone. The employment of the finely powdered metal catalyst in a fluidized bed with efficient cooling means also is a factor in permitting the use of high catalyst concentrations, since it facilitates the removal of heat from the relatively concentrated reaction zone. The improved operation, employing the finely divided metal catalyst, results in initial catalyst concentrations of at least 30 pounds per cubic foot of the fluidized dense catalyst phase, while the preferred gas velocities result in initial concentrations of 40 to 120, or more, pounds per cubic foot of dense phase. It will be understood that these figures refer to the initial average concentration in the dense phase. The accumulation of reaction products on the catayst particles as the operation proceeds reduces the catalyst density and increases the bulk of the dense fluidized mass.

The temperature employed may approximate those employed with the catalyst in question in fixed catalyst bed operations. With the iron catalyst, temperatures in the range of 450° F. to 750° F. are employed, while average temperatures between 550° F. and 650° F. are preferred. Likewise the pressures employed may approximate those previously employed in fixed bed operations. With the iron catalyst, for example, pressures between atmospheric pressure and the maximum pressure at which condensation is avoided may be employed. It is desirable, however, to employ pressures of at least 150 p. s. i. g., preferably between about 200 and about 600 pounds per square inch gage.

In this specification, pressures are expressed as pounds per square inch (gage) and gas volumes as cubic feet measured at 60° F. and atmospheric pressure.

The linear velocity of the gas stream passing upwardly through the dense phase is conveniently expressed in terms of the superficial velocity, which is the linear velocity the charge gas stream would assume if passed through the reactor in the absence of catalyst. This is designated either as inlet velocity or average superficial velocity, the latter taking into account the shrinkage in volume caused by the reaction. These velocities preferably are in the range of from 0.1 to 10 feet per second, but higher velocities may be used without departing from the scope of this invention.

In a preferred modification of the invention a metallic iron powder, having the preferred distribution of particle sizes and having combined therewith a small amount of promoters, such as alkalies and non-reducible oxides, is employed under special conditions of operation to effect rates of conversion not previously attained and to convert the major proportion of the oxygen of the carbon oxide reactant to water whereby only a minor proportion of the oxygen of the carbon oxide reactant is converted to carbon dioxide.

The improved process is carried out at space velocities substantially greater than those previously employed. The reactants are passed into and through the reaction zone at a space velocity equivalent to at least 30 standard cubic feet of total gaseous feed, per hour, per pound of metal catalyst in the catalyst phase of the reactor. In the hydrogenation of carbon monoxide with an iron catalyst, it is preferred to operate also at a space velocity equivalent substantially above 4, preferably at least 10, standard cubic feet of carbon monoxide, per hour, per pound of iron catalyst in the dense catalyst phase. In the improved process the mol ratio of hydrogen to carbon monoxide is at least 2.5:1 and preferably at least 5:1. The maximum space velocity is limited principally by the capacity of the equipment and the ability for removing the exothermic heat of reaction from the reaction zone. In pseudo-liquid dense phase catalyst operation, it is preferred to limit the maximum space velocity to an amount equivalent to 15 standard cubic feet of carbon monoxide, per hour, per pound of catalyst in the reactor.

The volume of reactants, per hour, per volume of dense catalyst phase depends upon the charge rate and also upon the density of the dense phase, the latter being affected by the condition of the catalyst and the gas velocity. At the preferred gas velocities mentioned above, and when employing the iron catalyst, the minimum space velocity with relation to carbon monoxide may be defined as about 400 volumes of carbon monoxide (measured at standard conditions of temperature and pressure) per hour per volume of the dense catalyst phase. The volume of dense catalyst phase is that occupied by the catalyst when fluidized in a fresh condition by the charge gas at the reaction velocity. The absolute space velocity of the total charge gas, which is at least 30, affected by the hydrogen to carbon monoxide ratio as well as by the presence of other constituents, such as nitrogen, carbon dioxide, and hydrocarbon gases. The reaction gas mixture may include, in addition to hydrogen and carbon oxide reactant, other relatively non-reactive ingredients, such as nitrogen, and hydrocarbon gases, such as methane, ethane and propane.

The operation is carried out with a charge gas containing hydrogen and carbon oxide reactant in a ratio substantially greater than the ratio in which these compounds are converted to other compounds in the reaction zone. Previous investigators have noted little advantage in the use of $H_2:CO$ ratios greater than 1:1 in connection with iron catalysts. In this improved process it has been discovered, however, that material advantages follow the use of $H_2:CO$ ratios greater than about 2.3:1, preferably greater than about 5:1. The presence of excess hydrogen in the reaction zone favorably affects the quality of the product, improves the selectivity of the reaction, minimizes the formation of carbon and thus facilitates operation at high temperature levels, lessens the formation of carbon dioxide, and minimizes the need for revivification of the catalyst.

In connection with the present invention it has been discovered that the conversion operation carried out in the manner described above can be extended substantially indefinitely without the necessity for catalyst regeneration by careful control of the ratio of hydrogen to carbon monoxide. In the foregoing operation the metal catalyst accumulates carbonaceous deposits including tarry material, waxy materials, hydrocarbon liquids and oxygenated compounds of high molecular weight. It is found that these deposits continue to accumulate on the catalyst at a rate and to a final percentage which is affected by the temperature and the ratio of hydrogen to carbon monoxide in the charge gas mixture. It has been found, when operating at temperatures effective for a high conversion rate, that the lower the ratio of hydrogen to carbon monoxide in the charge gas mixture the more rapid will be the accumulation of carbonaceous deposits on the catalyst surface and the higher will be the percentage of the catalyst mass represented by carbonaceous deposits when equilibrium conditions are reached. More specifically, it has been found that if the mol ratio of hydrogen to carbon monoxide is maintained greater than 5:1 the accumulation of carbonaceous deposits is stabilized at a relatively low percentage of the total catalyst mass whereby the activity of the catalyst under such stabilized conditions of operation is sufficiently high to continue the operation indefinitely without the necessity for revivification treatment of the catalyst. More specifically, it has been found that the operation can be continued indefinitely without catalyst regeneration if the $H_2$:CO ratio is maintained greater than 5:1, for example, about 10:1, or greater, but not higher than about 12:1.

Conveniently, the high $H_2$:CO ratio may be maintained in the charge gas mixture by the combined effect of supplying a fresh feed gas mixture containing hydrogen and carbon monoxide in a higher mol ratio than the ratio at which these components are reacted and recycling unconverted gases to form a composite charge gas mixture having the desired ratio of hydrogen to carbon monoxide. In the hydrogenation of carbon monoxide by the manner described above the carbon monoxide content of the charge gas mixture is substantially completely reacted during the passage of the charge gas through the reaction zone. Consequently, the unconverted gas contains hydrogen in an $H_2$:CO ratio substantially greater than in the charge gas. By recycling such unconverted gas in combination with a fresh feed containing $H_2$ and CO in a lower ratio than that desired in the charge gas a composite charge gas mixture having the desired ratio may be prepared.

The gases to be recycled may be obtained from the reaction product by a simple preliminary cooling of the product which separates only the more readily separable liquid reaction products, or the recycle gases may be obtained from the product gas after extensive condensation treatment to remove substantially all condensable hydrocarbons and oxygenated compounds. The volumetric ratio of recycle gas to fresh feed gas is preferably between about 0.5:1 and about 5:1, but other ratios may be used if desired, for example, ratios as low as 0.3:1 and as high as 10:1. A composite charge gas mixture may be formed by combining a fresh feed mixture having an $H_2$:CO ratio of about 3:1 with a recycle gas stream containing essentially no carbon monoxide to produce a composite feed containing hydrogen and carbon monoxide in a ratio of about 12:1. The carbon monoxide in this composite feed is substantially completely reacted in passing the mixture through the reaction zone, usually above 95 per cent conversion on an over-all basis. A portion of the unconverted gases is discarded from the system to prevent the accumulation of inerts, such as nitrogen, and the remainder may be recycled in an amount effective to produce the desired ratio in the composite charge gas.

The principal effect of a high $H_2$:CO ratio on the reaction product is the substantial elimination of $CO_2$ as a product. In previous operations employing $H_2$:CO ratios heretofore considered desirable, about 40 per cent of the CO converted appeared in the product as $CO_2$. In the practice of this invention it has been possible to avoid any production of $CO_2$ and even effect consumption of $CO_2$ in the feed gas, and a major proportion of the oxygen of the carbon monoxide is converted to water.

In operating a synthesis process in accordance with the present invention in which the normally gaseous products include carbon dioxide, the total inlet feed contains at least 6 or 7 volume per cent carbon dioxide. It is preferred, however, to limit the carbon dioxide content of the total inlet feed including recycle to less than 25 volume per cent. Particularly good results have been observed with the carbon dioxide concentration of the total feed inlet gas between about 8 and about 14 volume per cent. The fresh feed will usually contain less than 6 volume per cent carbon dioxide and the carbon dioxide content of the total charge gas is thus made up by recycle. After the recycle has built up the carbon dioxide content of the total feed gas within the above limits, the carbon dioxide, under the preferred conditions, will be consumed at a rate substantially equivalent to the amount of carbon dioxide charged and thus eliminating the net production of carbon dioxide and rejection of the combined oxygen of the feed as water rather than carbon dioxide. Some of the oxygen will be converted to oxygenated organic compounds but the major proportion of the oxygen is converted to water.

The rejection of oxygen from the system as water rather than carbon dioxide is particularly advantageous as it minimizes the size and complexity of subsequent treating equipment by eliminating the treatment of the effluent to remove carbon dioxide and by minimizing venting of a portion of the product gas. The water is removed from the effluent by simple condensation at operating pressure or lower.

Suitable contact times between about 8 and about 95 seconds have been found satisfactory, preferably between 14 and 35 seconds.

If regeneration or revivification of the catalyst is required, regeneration may be accomplished by mere stripping with hydrogen, carbon dioxide, steam or other gas, or by oxidation with air, steam or oxygen at a temperature between about 600° F. and 2000° F. or by reduction with hydrogen at a temperature between about 500° F. and about 1000° F., or by any combination of the above. Regeneration may be effected in separate equipment by removal of spent catalyst, or in the same equipment used for synthesis by discontinuing the flow of reaction gas and substitution of regeneration gas.

The invention will be described further by reference to the accompanying drawing which is a view in elevation, partly in section, of a reactor employed in carrying out the present invention, and by reference to specific examples of operations embodying the present invention and carried out in apparatus exemplified by the drawing.

Referring to the drawing, reactor 11 consists of a length of extra heavy standard 2-inch steel pipe which is about 153 inches long and has inside and outside diameter of 1.94 inches and 2.38 inches, respectively. Reactor 11 is connected, by conical section 12, to an inlet pipe 13 made of extra heavy standard half-inch steel pipe having an inside diameter of 0.55 inches. Reactor 11 is connected at the top, by means of conical section 14, with an enlarged conduit 15 comprising a length of 6-inch extra heavy standard steel pipe having an inside diameter of 5.76 inches. Conical section 14 and conduit 15 constitute an enlarged extension of reactor 11 which facilitates disengagement of catalyst from the gas stream after passage of the latter through a dense catalyst phase.

Conduit 15 is connected by means of manifold 16 with conduits 17 and 18 which comprise other sections of extra heavy 6-inch standard steel pipe. Conduits 17 and 18 contain filters 19 and 20 which are constructed of porous ceramic material which is permeable to the gas and vapors emerging from the reaction zone but impermeable to the catalyst particles carried by entrainment in the gas stream. Filters 19 and 20 are cylindrical in shape and closed at the bottom ends. They are dimensioned in relation to conduits 17 and 18 to provide a substantial annular space between the filter and the inner wall of the enclosing conduit for the passage of gases and vapors and entrained catalyst upwardly about the outer surface of the filter. The upper ends of filters 19 and 20 are mounted in closure means 21 and 22 in a manner whereby the gases and vapors must pass through either filter 19 or filter 20 to reach exit pipes 23 and 24. Each of filters 19 and 20 is approximately 36 inches long and 4½ inches in outside diameter, the ceramic filter walls being approximately ¾ of an inch thick.

The greater part of reactor 11 is enclosed in the jacket 25 which extends from a point near the top of the reactor to a point sufficiently low to enclose the 3 inch length of conical section 12 and approximately 5 inches of pipe 13. Jacket 25 comprises a length of extra heavy 4-inch standard steel pipe having an inside diameter of 3.83 inches. The ends of jacket 25 are formed by closing the ends of the 4-inch pipe in any suitable manner, as shown, and sealed by welding. Access to the interior of jacket 25 is provided by an opening 26 in the top thereof through a 2-inch steel pipe. Jacket 25 is adapted to contain a body of liquid for temperature control purposes, such as water, or "Dowtherm" (diphenyl or diphenyl oxide or a mixture of same). The vapors which are evolved by the heat of reaction in reactor 11 are withdrawn through conduit 26, condensed by means not shown, and returned through conduit 26 to the body of temperature control fluid in jacket 25. Electrical heating means (not shown) is provided in connection with jacket 25 to heat the temperature control fluid therein to any desired temperature, for use particularly when starting up the hydrogenation reaction.

In order to show all the essential parts of the reactor and associated catalyst separation means on a single sheet a large proportion of the apparatus has been eliminated by the breaks at 27 and 28. For a clear understanding of the relative proportions of the apparatus reference may be had to the over-all length of the apparatus, from the bottom of jacket 25 to exit pipes 23 and 24, which is about 224 inches. In each of breaks 27 and 28 the portion of the apparatus eliminated is identical with that portion shown immediately above and below each break.

In the operations carried out in the apparatus of the drawing, the catalyst recovery means comprising filters 19 and 20 is effective to separate substantially completely entrained catalyst from the outgoing stream of gases and vapors. The disengagement of solids from the gas stream is promoted by the lowered velocity of the gas stream in conduit 15 and remaining solids are separated on the outer surfaces of filters 19 and 20. The latter are employed alternately during the operation so that the stream of gases and vapors and entrained solids passes from conduit 15 through either the left or right branches of manifold 16 into either conduit 17 or conduit 18. During the alternate periods the filter which is not in use is subjected to a back pressure of gas which is introduced at a rate sufficient to dislodge catalyst which has accumulated on the outer surface of the filter during the active period. Such "blowback" gas and dislodged catalyst flow downwardly in the conduit enclosing the filter and into manifold 16 in which the "blowback" gas is combined with the reaction mixture flowing upwardly from conduit 15. The greater part of the catalyst thus dislodged settles downwardly into the reactor and is thus returned for further use. The "blowback" gas conveniently comprises recycle gas, such as from conduit 41.

The amount of catalyst charged to the reactor initially is regulated, with reference to any preliminary treatment of the catalyst in the reactor and the gas velocity to be employed, whereby the upper level of the dense phase is substantially lower than the top of reactor 11. During the operation the accumulation of deposited reaction products on the catalyst particles may cause an expansion of the dense phase and a rise in the height of the dense phase. In certain of the operations discussed hereinafter the dense phase became extended up into members 15 and 16, and in other operations a portion of the catalyst was withdrawn to control the volume of the dense phase.

In the operation of the apparatus of the drawing, the desired quantity of powdered catalyst is introduced directly into the reactor through a suitable connection, not shown, in conduit 15. After any desired preliminary activation treatment, the temperature of the fluid in jacket 25 is adjusted when necessary, by conventional heating or cooling means or by controlling the pressure of jacket 25, to the temperature desired to be maintained in jacket 25 during the reaction. After the catalyst mass has reached the desired reaction temperature the introduction of the reaction mixture through pipe 13 is initiated. The reaction mixture may be preheated by means not shown approximately to the reaction temperature prior to its introduction through pipe 13 or the reactants may be heated to the reaction temperature through the passage thereof through that portion of pipe 13 which is enclosed by jacket 25 and by contact with the hot catalyst. It will be understood, furthermore, that the enclosure of pipe 13 in jacket 25 is not necessary to the invention and that the reactants may be heated to the reaction temperaure solely by contact with hot catalyst. Generally, reactor 11 is maintained at a superatmospheric pressure during both activation and hydrogenation.

Pipe 13 is dimensioned with respect to reactor 11 and the desired superficial velocity whereby the linear velocity of the gases passing through pipe 13 is sufficiently high to prevent the passage of solids downwardly into pipe 13 against the incoming gas stream. A ball check valve, not shown, is provided to prevent solids from passing downwardly out of the reactor when the gas stream is not being introduced into pipe 13.

The reaction effluent from reactor 11 is removed therefrom through either or both conduits 23 and 24 and passed by means of conduit 31 to a primary condensation unit 32. Condensation unit 32 comprises a jacketed accumulator in which steam is passed around the accumulator through a jacket to cool the reaction effluent to a temperature of about 300° F. at the operating pressure existing in reactor 11. Cooling of the reaction effluent at the operating pressure to about 300° F. condenses the relatively high molecular weight organic compounds and waxes and a small amount of water, which products are removed from the condensation unit 32 through conduit 33. Uncondensing vapors are removed from condensation unit 32 and passed through a condenser 36 to accumulator 37. Condenser 36 cools the reaction effluent to a temperature below about 100° F. and results in the accumulation of two liquid phases in accumulator 37. The two liquid phases formed in accumulator 37 comprise a heavy water-rich phase containing dissolved oxygenated organic compounds and a lighter hydrocarbon-rich phase which also may contain some oxygenated organic compounds having more than four carbon atoms per molecule. The two liquid phases are withdrawn from accumulator 37 through conduit 38 for subsequent recovery and purification by conventional means not shown, such as by distillation and extraction. Uncondensed components of the reaction effluent comprising unreacted hydrogen and carbon monoxide, methane and carbon dioxide are removed from accumulator 37 through conduit 39. These gases are recycled through conduit 41 to inlet conduit 13 of reactor 11 to supplement the feed thereto and to alter the ratio of hydrogen to carbon monoxide and the carbon dioxide concentration in reactor 11. The presence of methane, excess hydrogen and diluents in the recycle stream serves to strip the relatively heavy organic compounds and waxes from the catalyst particles in reactor 11 and is thus an aid in preventing settling of the fluid-bed of catalyst.

In this apparatus operating runs were made to test the efficacy of the process in the treatment of a gas charge containing hydrogen and carbon monoxide to convert these reactants to hydrocarbons and oxygenated compounds. In each operating run conditions were varied to test the effect of various combinations of operative conditions. The results of each operating run are represented by the results observed during a stabilized period of operation under a given combination of operating conditions. The conditions of operation and the results obtained in these operating runs are described below in the following examples.

In the following more detailed description references to linear velocity in the reactor are based on the cross-sectional area of the straight portion of the reactor, ignoring the effect of the presence of the catalyst. The inlet velocity is calculated from the gas rate entering the bottom of the reactor, with correctons for temperature and pressure existing at the bottom of the reactor. The average superficial linear velocity is calculated from the arithmetic average of the gas rate at the bottom of the reactor and at the top of the reactor. The latter is arrived at by correcting the outlet gas volume for water and hydrocarbons condensed in the receivers, with corrections for pressure and average catalyst temperature. Contact times referred to below are the superficial time, in seconds, that the gas taken in passing through the dense phase of the catalyst bed. It is calculated by dividing the dense bed height by the average superficial velocity.

EXAMPLE I

The catalyst for use in this operation was prepared from an ammonia synthesis catalyst which had been prepared by fusion of alumina and potassium oxide in molten iron oxide to produce a mixture of iron oxide, alumina and potassium oxide. This material consisted principally of iron oxide and contained 2.9 per cent alumina, 1.7 per cent potassium oxide and 68.6 per cent iron. To prepare this material for use in this improved process it was first ground to a 6–20 mesh size and then subjected to leaching with water to remove potassium oxide. This treatment reduced the potassium oxide content from 1.7 per cent to 0.55 per cent. The leached material was then dried at 210° F. and reduced in a stream of hydrogen.

In the reduction treatment a heated stream of hydrogen was passed through a granular mass, treated to remove water formed by the reduction reaction, and then recirculated. The temperature was raised gradually and the reduction reaction was initiated at about 700–800° F. The temperature of the catalyst mass was then raised to about 1215° F. in 2 hours while continuing the flow of the hydrogen stream. During the next 4 hours the temperature was raised to approximately 1285° F., during which time the reduction was substantially completed, as evidenced by the practical cessation of water formation.

The reduced catalyst was ground in an atmosphere of $CO_2$, first in a hand grinder and then in a ball mill, to produce a powder having the following screen and roller analyses:

*Roller analysis*

| Particle size: | Percent |
|---|---|
| 0–10 Microns | 11.0 |
| 10–20 | 16.4 |
| 20–40 | 20.6 |
| 40–60 | 32.2 |
| 60+ | 19.8 |

*Screen analysis*

| U. S. Standard sieve: | Percent |
|---|---|
| +40 mesh | Trace |
| 40–60 | Trace |
| 60–80 | 0.5 |
| 80–100 | 0.5 |
| 100–120 | Trace |
| 120–140 | Trace |
| 140–200 | 13.5 |
| 200–Pan | 84.5 |

11,316 grams of catalyst thus prepared were charged into reactor 1 through an inlet (not shown) in section 5. During this operation the catalyst was maintained in the atmosphere of $CO_2$ and a small stream of 1 or 2 cu. ft. of $CO_2$ per hour was passed upwardly through reactor 1 to prevent packing of the catalyst. After the catalyst was charged to reactor 1 the $CO_2$ stream was replaced with a stream of hydrogen which was passed upwardly through reactor 1 at the rate of 15 to 20 cu. ft. per hour. The reactor was then heated externally while hydrogen was passed upwardly through the reactor at this rate. When a temperature of 530° F. was reached the hydrogen stream was replaced by a stream of synthesis gas consisting essentially of $H_2$ and CO in the ratio of about 2:1. The synthesis gas was passed upwardly through reactor 1 at the rate of 32–46 cu. ft. per hour. At the same time the outlet pressure on the reactor was increased to 15 pounds. After 3 hours at this condition the flow rate was raised to 60 cu. ft. per hour and the pressure was raised to 30 pounds. After 5 hours longer the flow rate was raised to 90 cu. ft. per hour and the pressure was raised to 60 pounds. After 5 hours of operation at the last-mentioned condition the flow rate was increased to 120 cu. ft. per hour and the pressure was raised to 100 pounds. At that condition the desired conversion of $H_2$ and CO to hydrocarbons was soon achieved and subsequently the pressure was reduced to 80 pounds to control the rate of reaction.

Because of the extreme rapidity of the strongly exothermic reaction between $H_2$ and CO relative to the rate of mixing at the rather low linear velocities employed, the initial period of operation may be considered as a catalyst activation conditioning, or induction period. During the first several days of operation temperature conditions were observed to be somewhat different from those observed subsequently. Following this preliminary conditioning period, the activity and composition of the catalyst became more or less stabilized, the rate of change being largely a function of operating conditions.

This operation which included single pass without recycle was continued for a total run length of 812 hours, at which time the operation was terminated voluntarily to free the apparatus for another operation. During the operating run various combinations of operating conditions were tested. The results observed in periods of stabilized operation are set forth in Table I.

stabilized operation there were short periods of operation in which operating conditions were being changed. Results observed during these periods of unsettled operation are not presented, as they would be without significance. In effect, therefore, each of the periods of operation for which data are presented in Table I represents an independent run whose results are comparable with the results of the other runs, except for changes in the condition of the catalyst. The superficial contact times employed in these periods ranged from 35 to 95 seconds. The data

TABLE I

|  | A | B | C | D | E | F | G | H | J | K | L | M | N |
|---|---|---|---|---|---|---|---|---|---|---|---|---|---|
| Operating Conditions: | | | | | | | | | | | | | |
| Reactor Temp., Ave., °F.— | | | | | | | | | | | | | |
| 12 ft. above pipe 3 | 535 | 528 | 524 | 531 | | | 540 | 540 | 543 | 580 | 649 | 611 | 600 |
| 10.5 ft. above pipe 3 | 550 | 545 | 538 | 549 | 543 | 531 | 532 | 545 | 535 | 572 | 649 | 599 | 596 |
| 8.5 ft. above pipe 3 | 562 | 556 | 562 | 581 | 558 | 552 | 546 | 559 | 547 | 570 | 650 | 615 | 609 |
| 6.5 ft. above pipe 3 | 566 | 578 | 572 | 587 | 594 | 587 | 549 | 567 | 554 | 568 | 651 | 614 | 610 |
| 4.5 ft. above pipe 3 | 587 | 598 | 628 | 614 | 620 | 613 | 581 | 582 | 566 | 572 | 664 | 622 | 617 |
| 2.5 ft. above pipe 3 | 584 | 592 | 606 | 588 | 580 | 562 | 565 | 585 | 569 | 569 | 661 | 620 | 618 |
| 1.5 ft. above pipe 3 | 561 | 572 | 612 | 579 | 546 | 538 | 548 | 588 | 572 | 570 | 662 | 622 | 619 |
| 0.5 ft. above pipe 3 | 479 | 364 | 372 | 403 | 484 | 512 | 519 | 587 | 571 | 569 | 644 | 616 | 616 |
| Feed Gas Temp., °F. | 438 | 441 | 425 | 435 | 436 | 444 | 449 | 499 | 507 | 568 | 616 | 544 | 505 |
| Reactor Outlet Pr., p. s. i. g. | 98 | 80 | 81 | 80 | 81 | 81 | 80 | 81 | 149 | 52 | 49 | 80 | 80 |
| Gas Throughputs, s. c. f./hr.— | | | | | | | | | | | | | |
| Gas Entering Catalyst Bed | 132.2 | 146.4 | 133.7 | 162.7 | 215.1 | 250.1 | 293.3 | 311 | 406.4 | 291.3 | 204.8 | 292.7 | 194.8 |
| Normally gaseous components leaving reactor | 70.7 | 82.7 | 73.0 | 87.8 | 107.5 | 120.9 | 168.5 | 155.5 | 186.2 | 214.0 | 96.9 | 153.5 | 94.8 |
| Blow Back to Filter | 29.7 | 33.4 | 17.9 | 25.0 | 24.2 | 25.1 | 31.7 | 31.2 | 18.4 | 22.5 | 22.8 | 26.6 | 17.9 |
| Analysis—Gas Entering Bed, Mol Percent— | | | | | | | | | | | | | |
| Hydrogen | 62.7 | 62.5 | 63.9 | 63.8 | 63.1 | 62.6 | 62.4 | 62.9 | 61.6 | 62.9 | 62.1 | 62.6 | 54.7 |
| Carbon Monoxide | 32.8 | 33.0 | 30.4 | 31.2 | 33.2 | 33.7 | 34.4 | 31.5 | 31.2 | 29.6 | 32.6 | 31.0 | 38.8 |
| Carbon Dioxide | 1.7 | 1.6 | 1.6 | 2.1 | 1.4 | 0.7 | 1.1 | 1.8 | 2.7 | 2.5 | 1.8 | 1.2 | 0.9 |
| Hydrocarbons and Inerts | 2.8 | 2.9 | 4.1 | 2.9 | 2.3 | 3.0 | 2.1 | 3.8 | 4.5 | 5.0 | 3.5 | 5.2 | 5.6 |
| $H_2$:CO—Gas Entering Bed | 1.91 | 1.89 | 2.10 | 2.04 | 1.90 | 1.86 | 1.81 | 2.00 | 1.97 | 2.12 | 1.91 | 2.02 | 1.41 |
| Inlet Velocity, Ft./Sec. | 0.42 | 0.49 | 0.43 | 0.54 | 0.76 | 0.90 | 1.06 | 1.21 | 0.96 | 1.45 | 1.05 | 1.18 | 0.81 |
| CO/Hr./Lb. Fe, s. c. f. | 1.8 | 2.1 | 1.8 | 2.2 | 3.7 | 4.5 | 5.3 | 5.2 | 6.7 | 4.6 | 3.6 | 4.8 | 4.0 |
| Yields: | | | | | | | | | | | | | |
| Vol. Percent Contraction | 45.1 | 41.9 | 44.1 | 44.5 | 48.9 | 50.7 | 41.2 | 50.0 | 52.8 | 24.6 | 51.3 | 46.1 | 49.8 |
| $C_3$'s, cc./cu. meter of feed gas | | | | | 32 | 35 | 23 | 34 | | | | | 44 |
| $C_4$'s, cc./cu. meter of feed gas | | | | | 8 | 5 | 14 | 12 | | | | | 13 |
| $C_5$'s, cc./cu. meter of feed gas | | | | | 6 | 6 | 2 | 11 | | | | | 11 |
| Light Naphtha, cc./cu. meter of feed gas | 11 | | | 20 | 15 | 20 | 19 | 23 | 13 | | 19 | 26 | 27 |
| Heavy Oil, cc./cu. meter of feed gas | 54 | 48 | 41 | 42 | 42 | 50 | 42 | 47 | 62 | 13 | 19 | 20 | 49 |
| Tot. Liq. Hydrocarbons, cc./cu. meter of feed gas | | | | | 103 | 116 | 100 | 127 | | | | | 144 |
| Water, cc./cu. meter of feed gas | 50 | 40 | 69 | 64 | 58 | 62 | 42 | 67 | 79 | 21 | 74 | 70 | 59 |
| Tot. Liq. Hydrocarbons, Gals./Day/Lb. Fe | | | | | 0.21 | 0.28 | 0.28 | 0.38 | | | | | 0.27 |
| Oxygenated Comp'ds in Water, cc./cu. meter of feed gas | 7 | 5 | 7 | 8 | 7 | 7 | 5 | 6 | 10 | 2 | 5 | 5 | 3 |
| Percent $H_2$ Disappearance | 47.7 | 48.2 | 52.0 | 51.7 | 55.5 | 56.8 | 44.8 | 53.8 | 62.0 | 30.7 | 63.5 | 57.3 | 65.9 |
| Percent CO Disappearance | 100 | 100 | 100 | 100 | 100 | 100 | 85.6 | 100 | 100 | 57.9 | 100 | 98.8 | 100 |
| $H_2$:CO Reaction Ratio | 0.91 | 0.91 | 1.09 | 1.05 | 1.05 | 1.05 | .95 | 1.10 | 1.22 | 1.12 | 1.21 | 1.17 | 0.93 |
| CO Distribution— | | | | | | | | | | | | | |
| Mol Percent to $CO_2$ | | | | | 39.0 | 34.2 | 37.9 | 30.4 | | | | | 37.3 |
| Mol Percent to $CH_4$ | | | | | 12.2 | 9.2 | 10.1 | 10.8 | | | | | 10.4 |
| Mol Percent to $C_2$'s | | | | | 6.8 | 8.0 | 6.4 | 9.3 | | | | | 8.3 |
| Mol Percent to $C_3$'s and heavier | | | | | 38.6 | 44.0 | 42.6 | 47.1 | | | | | 42.7 |
| Mol Percent to Oxygenated Comp'ds | | | | | 3.4 | 4.6 | 3.0 | 2.4 | | | | | 1.3 |
| Mol Percent to $C_3$'s and heavier | | | | | 26.3 | 31.7 | 29.4 | 33.0 | | | | | 28.3 |
| Heavy Oil Inspections: | | | | | | | | | | | | | |
| Gravity, °A. P. I. | 54.6 | 52.1 | 51.5 | 51.9 | 51.8 | 53.4 | 50.0 | 55.2 | 56.9 | 45.8 | 35.8 | 52.2 | 52.9 |
| ASTM Distillation, °F.— | | | | | | | | | | | | | |
| I. B. P. | 150 | 185 | 136 | 166 | 121 | 132 | 164 | 180 | 134 | 171 | 208 | 144 | 140 |
| 5% | 183 | 227 | 183 | 202 | 178 | 179 | 206 | 190 | 180 | 233 | 261 | 188 | 180 |
| 10% | 221 | 243 | 210 | 221 | 196 | 197 | 228 | 206 | 196 | 257 | 283 | 210 | 206 |
| 30% | 298 | 302 | 273 | 280 | 264 | 264 | 291 | 264 | 256 | 325 | 350 | 273 | 264 |
| 50% | 390 | 385 | 337 | 346 | 333 | 331 | 371 | 332 | 324 | 420 | 439 | 337 | 338 |
| 70% | 524 | 497 | 442 | 457 | 445 | 445 | 479 | 430 | 433 | 580 | 569 | 439 | 442 |
| 90% | 702 | 722 | 646 | 698 | 644 | 670 | 696 | 682 | 665 | 737 | 744 | 679 | 646 |
| 95% | 722 | crkd. | 735 | crkd. | 738 | crkd. | crkd. | crkd. | crkd. | crkd. | crkd. | crkd. | 732 |
| E. B. P. | 747 | at 92.5 | 755 | at 93.5 | crkd. | at 94.5 | at 95 | | | | | | crkd. |
| Mol Percent Mono-olefins | 34.9 | 59.5 | | 69.3 | 64.8 | | 66.1 | 75.7 | 70.7 | 61.2 | 55.6 | 66.9 | 55.2 |
| Adsorber Naphtha Inspections: | | | | | | | | | | | | | |
| Gravity, °A. P. I. | 84.1 | | | 80.8 | 80.3 | 83.2 | 81.5 | 82.2 | 80.6 | | 77.8 | 79.4 | 82.0 |
| ASTM Distillation, °F.— | | | | | | | | | | | | | |
| I. B. P. | 82 | | | 80 | 85 | 80 | 83 | 83 | 87 | | 84 | 83 | 83 |
| 5% | 94 | | | 93 | 98 | 86 | 96 | 94 | 104 | | 99 | 98 | 95 |
| 10% | 98 | | | 98 | 102 | 89 | 100 | 97 | 110 | | 105 | 102 | 98 |
| 30% | 109 | | | 114 | 115 | 97 | 111 | 107 | 128 | | 125 | 116 | 108 |
| 50% | 123 | | | 134 | 131 | 112 | 123 | 120 | 143 | | 148 | 132 | 120 |
| 70% | 145 | | | 172 | 156 | 132 | 144 | 140 | 158 | | 176 | 156 | 139 |
| 90% | 212 | | | 234 | 219 | 198 | 201 | 180 | 189 | | 206 | 197 | 187 |
| 95% | 254 | | | 265 | 251 | 250 | 246 | 194 | 204 | | 221 | 216 | 208 |
| E. B. P. | 297 | | | 306 | 292 | 307 | 300 | 219 | 234 | | 244 | 258 | 230 |
| Reid Vapor Pressure, p. s. i. | 15.5 | | | 16.4 | 15.0 | 20.2 | 16.5 | 15.6 | 13.6 | | 13.6 | 15.2 | 14.9 |
| Mol Percent Mono-olefins | 39.6 | | | 65.9 | 70.2 | 78.8 | 80.6 | 74.1 | 70.3 | | 76.6 | 73.0 | 72.4 |
| Hours On Condition | 18 | 12 | 12 | 18.3 | 24 | 17 | 12 | 72 | 30 | 24 | 24 | 42 | 36 |
| Total Operating Hours | 46 | 58 | 130 | 148.35 | 214 | 231 | 266.5 | 454.5 | 497 | 608 | 662 | 737 | 787 |

The data in Table I are arranged to present the results observed in 13 periods of stabilized operation during this operating run. Before and after each of these periods of in line 20 are based on the total quantity of iron in the catalyst initially charged to the reactor. The effective charge rates would, therefore, be somewhat higher than the figures given in line 20, since some of the catalyst would be retained on the sloping surfaces of the apparatus at 4 and 6 and out of effective contact with the stream of reactants. Likewise some of the catalyst forms a permanent mat on the filter surface. At the beginning of the operation of Table I the aeration of the catalyst bed resulted in an average density of the pseudo-liquid fluidized dense phase of over 100 pounds per cubic foot and the upper level of the dense phase was approximately 10 feet above pipe 3. However, accumulations of carbonaceous deposit on the catalyst particles, which doubled the weight of the catalyst mass and reduced the density of the catalyst particles, reduced the density of the fluid bed whereby the upper level of the dense phase rose substantially higher than 10 feet above pipe 3 to levels in manifold 6. The density of the dense phase was reduced also by the subsequent increases in the inlet velocity of the gas stream. The combination of these effects reduced the density of the dense phase to about 40 pounds per cubic foot and increased the volume about four-fold.

During the whole operation of Table I the flow of the reaction mixture out of the reactor was alternated between filter 9 and filter 10 every 15 minutes, and the off-stream filter was blown back with feed gas at the rate necessary to clear the filter of adhering the catalyst.

During the run of Table I the reaction products were recovered for the most part by cooling the reaction mixture to room temperature, or lower, to obtain a condensate, and then passing the remaining gas through an adsorbent. The condensate comprised both heavy oil and water product fractions. The heavy oil fraction contained a small quantity of oxygenated compounds and the water product fraction contained substantial amounts of oxygenated compounds. The adsorbed product was recovered by steam distillation, which produced a light naphtha fraction condensate water and a gas fraction. The condensate water contained additional oxygenated compounds. The gas fraction was almost entirely hydrocarbons having 3, 4 or 5 carbon atoms per molecule. The yields of the various fractions were determined by measurement of the condensed product and by absorption and combustion analyses of the gas from the condenser.

After period L, hydrogen at a rate of 15 cu. ft. per hour was substituted for synthesis gas. Simultaneously the pressure was reduced to one atmosphere and the temperature to 500° F. The hydrogen was kept in for nine hours, after which synthesis was resumed.

Immediately following period M and after 737 hours of operation, there occurred a brief period of operation at relatively high temperature. Following this high temperature operation, the catalyst was subjected to a revivification treatment with hydrogen. In this treatment, the unit pressure was reduced to 30 pounds per square inch and one hour later the synthesis gas was replaced with hydrogen at about 25 cubic feet per hour and the temperature was reduced to about 500° F. After 4 hours, the temperature was raised to about 615° F. over a period of 3 hours. The pressure was maintained at 30 pounds per square inch for 6 hours of the hydrogen treatment and then raised to 80 pounds per square inch for the remaining 3 hours.

Operating period N, which immediately followed the revivification treatment, may be referred to for an example of the results obtained during this operating run. In this period of 36 hours the "Dowtherm A" in jacket 15 was maintained under a pressure of 20 pounds per square inch to produce a temperature in jacket 15 of 580° F. During this operation the height of the dense bed was approximately 15.4 feet above pipe 3, whereby the upper level of the dense bed was located in manifold 6. The catalyst density in the dense phase was approximately 44 pounds per cubic foot whereby the space velocity was approximately 160 volumes of feed gas per hour per volume of dense phase. The quality of the liquid products obtained is indicated in Table I. The gas fraction obtained from the adsorber comprised about 75 per cent olefins. The gas from the condenser contained no carbon monoxide not attributable to the blow-back gas. This indicated complete conversion of carbon monoxide in the reactor to hydrocarbons, oxygenated compounds and carbon dioxide. The amounts of these products detected in the reaction product mixture accounted for 99 per cent of the carbon monoxide charged to the reactor.

For an example of the quality of the product made during the operating run of Table I, reference can be had to determinations made on the product obtained in period H. These determinations were made on a specimen prepared by blending the light naphtha and condensed oil, debutanizing the blend, and distilling it to 300° F. end point. At the same time a diesel oil boiling between 338° F. and 650° F. was obtained. The raw gasoline thus obtained was 65.1 per cent of the total of the light naphtha and condensed oil. The diesel oil fraction accounted for 31.5 per cent, and the remaining 3.4 per cent was material boiling above 650° F. The raw gasoline fraction had an aniline point of 88° F., a gravity of 73.1 API and a Reid vapor pressure of 8.5 pounds per square inch. The diesel oil fraction had an ASTM pour point of −15° F. and a diesel index of 61.5. The octane number determinations on the raw gasoline are given in the first column of the following table.

|  | Raw Gasoline | 100% Pentane Recovery | Total Product |
|---|---|---|---|
| Octane No. (ASTM) | 69 | 71 | 74 |
| Octane No. (ASTM)+3 cc. TEL | 79 | 80 | 82 |
| Octane No. (CFR-R) | 77 | 80 | 84 |
| Octane No. (CFR-R)+3 cc. TEL | 91 | 92 | 94 |

In the foregoing table the octane numbers given under the heading "100% Pentane Recovery" are based on blending, with the raw gasoline, all the pentane-pentene fraction not recovered in the condensate oil or in the light naphtha. The octane numbers under the column headed "Total Product" are based on 100% pentane recovery, the addition of the polymer product obtained by polymerizing the propylene and butylene portion of the product, and the addition of a sufficient proportion of the butane product to produce a gasoline having a Reid vapor pressure of 10 pounds per square inch.

A concentrate of low molecular weight oxygenated chemicals was obtained by careful distillation of a blend of several aqueous fractions produced at 80 pounds per square inch.

Originally, the water layer contained approximately 8 per cent oxygenated compounds. The distillation was conducted in a batch column equivalent to about 10 theoretical plates. Before commencing the distillation, a small amount of caustic was added to the still pot to neutralize the organic acids present. Formaldehyde and acetaldehyde were present in the original water solution, but the amounts were very small and not determined. The concentrate of oxygenated compounds from the primary distillation was subsequently refractionated for identification purposes. Five principal cuts were obtained which were predominantly acetone, methyl ethyl ketone, ethanol, n-propanol, and n-butanol, results for which appear below.

| Blend Number | Vapor, Temp., °F. | Principal Constituent | Water Content of Cut, Wt. Percent | Yield on Concentrate, Vol. Percent |
|---|---|---|---|---|
| I | 131–132 | Acetone | 0.5 | 18 |
| II | 162–163 | Methyl ethyl ketone | 7.6 | 7 |
| III | 171–175 | Ethanol | 7.6 | 30 |
| IV | 187–190 | n-Propanol | 27.7 | 15 |
| V | 198–200 | n-Butanol |  | 5 |

As the distillation progressed to a vapor temperature above 192° F., a condensate consisting of two phases appeared. The upper and lower phases were principally n-butanol and water, respectively.

EXAMPLE II

The catalyst for use in this operation was prepared from the same source material as the catalyst in Example I, and by the same general procedure. In this case, however, the catalyst was leached sufficiently to reduce the potassium oxide content from 1.7 to 0.41 per cent. The leached granular material was dried at 200° F. overnight and then reduced in a stream of hydrogen in the general manner described in Example I. Reduction of the catalyst was initiated at about 700° F. thereafter and the temperature of the catalyst mass was raised to about 1350° F. in 4 hours, while continuing the flow of the hydrogen stream. This condition was maintained for 2 hours longer, during which time the reduction was substantially completed. The reduced mass was then cooled to room temperature in the hydrogen atmosphere.

The reduced catalyst was then ground, first in a hand mill and then in a ball mill, to the desired degree of fineness. Throughout this period the catalyst was not permitted to come in contact with air, the grinding operations being conducted in an atmosphere of $CO_2$. The catalyst powder had the following screen and roller analyses:

Roller analysis

| Particle size: | Percent |
|---|---|
| 0–10 microns | 17 |
| 10–20 | 19.5 |
| 20–40 | 24 |
| 40–60 | 32 |
| 60+ | 7.5 |

Screen analysis

| U. S. Standard sieve: | Percent |
|---|---|
| +40 mesh | Trace |
| 40–60 | Trace |
| 60–80 | Trace |
| 80–100 | Trace |
| 100–120 | Trace |
| 120–140 | Trace |
| 140–200 | 5 |
| 200–Pan | 93.5 |

9,080 grams of this catalyst were then charged into reactor 1 by the procedure described in Example I. After starting the passage of hydrogen through the reactor at the rate of 15–20 cubic feet per hour the outlet pressure on the reactor was then raised to 80 pounds and the temperature in the reactor was raised to approximately 450° F. by means of the heating coils around jacket 15. The hydrogen flow rate was then increased to 50 cubic feet per hour and the temperature was then raised to 500° F. Then the hydrogen stream was replaced with a stream of synthesis gas consisting essentially of $H_2$ and CO in the ratio of 2:1. The synthesis gas was passed upwardly through the reactor at the rate of 140 cubic feet per hour. After one hour the temperature was raised to 550° F. and the flow rate was increased to 200 cubic feet per hour. After 5 hours longer the temperature was raised to 620° F. and after 3 hours operation at 620° F. the flow rate was increased to 325 cubic feet per hour. At that point conversion of the $H_2$ and CO to hydrocarbons started, and the temperature was reduced to 600° F. Operation at these conditions was continued for 35 hours longer, at which time the pressure was raised to 100 pounds.

This operation was continued for a total run length of 1166 hours, after which the operation was terminated voluntarily to free the apparatus for another operation. During this period the superficial gas contact times were varied between 14 and 35 seconds. The results observed in periods of stabilized operation are set forth in Table II.

TABLE II

| | A | B | C | D | E | F | G | H | J | K | L | M | N | P | Q | R | S |
|---|---|---|---|---|---|---|---|---|---|---|---|---|---|---|---|---|---|
| Operating Conditions: | | | | | | | | | | | | | | | | | |
| Reactor Temp., Ave., ° F.— | | | | | | | | | | | | | | | | | |
| 12 ft. above pipe 3 | 540 | 549 | 548 | 562 | 583 | 585 | 577 | 538 | 523 | 500 | 506 | 539 | 557 | 576 | 555 | 530 | 530 |
| 10.5 ft. above pipe 3 | 541 | 548 | 548 | 561 | 576 | 580 | 574 | 543 | 526 | 510 | 528 | 547 | 562 | 577 | 563 | 543 | 543 |
| 8.5 ft. above pipe 3 | 546 | 553 | 555 | 567 | 575 | 581 | 576 | 560 | 542 | 536 | 556 | 574 | 587 | 593 | 584 | 575 | 570 |
| 6.5 ft. above pipe 3 | 550 | 559 | 561 | 576 | 578 | 585 | 583 | 569 | 554 | 546 | 568 | 593 | 608 | 608 | 608 | 591 | 587 |
| 4.5 ft. above pipe 3 | 560 | 575 | 582 | 594 | 587 | 594 | 590 | 579 | 561 | 558 | 587 | 611 | 618 | 618 | 618 | 610 | 605 |
| 2.5 ft. above pipe 3 | 571 | 594 | 608 | 607 | 588 | 596 | 589 | 577 | 558 | 565 | 604 | 612 | 614 | 618 | 608 | 621 | 617 |
| 1.5 ft. above pipe 3 | 576 | 598 | 614 | 609 | 586 | 594 | 587 | 577 | 554 | 556 | 606 | 606 | 612 | 620 | 607 | 623 | 619 |
| 0.5 ft. above pipe 3 | 573 | 582 | 592 | 593 | 580 | 591 | 576 | 573 | 544 | 539 | 587 | 583 | 598 | 610 | 578 | 617 | 615 |
| Feed Gas Temp., ° F | 450 | 370 | 403 | 512 | 501 | 508 | 526 | 508 | 507 | 545 | 459 | 381 | 463 | 575 | 481 | 552 | 546 |
| Reactor Outlet pressure, p. s. i. g. | 102 | 148 | 150 | 246 | 250 | 245 | 151 | 150 | 248 | 250 | 152 | 251 | 249 | 249 | 249 | 250 | 251 |
| Gas Throughputs, s. c. f./hr.— | | | | | | | | | | | | | | | | | |
| Fresh Feed | 220.6 | 276.2 | 402.4 | 404.0 | 329.4 | 351.6 | 281.5 | 277.3 | 304.8 | 220.3 | 380.7 | 425.6 | 322.3 | 467.3 | 285.7 | 207.0 | 210.7 |
| Gas Entering Catalyst Bed | 310.2 | 401.1 | 402.4 | 629.9 | 670.3 | 656.7 | 404.9 | 403.9 | 636.7 | 636.0 | 380.7 | 687.3 | 866.6 | 901.3 | 585.2 | 424.0 | 410.7 |
| Normally gaseous components leaving reactor | 165.1 | 209.7 | 176.3 | 343.2 | 448.4 | 407.5 | 230.6 | 216.5 | 400.0 | 476.0 | 202.7 | 579.4 | 650.5 | 627.5 | 418.3 | 275.1 | 269.9 |
| Net Product Gas | 93.3 | 87.0 | 176.3 | 141.7 | 109.5 | 104.4 | 100.8 | 90.1 | 86.6 | 60.4 | 202.7 | 133.2 | 106.2 | 193.5 | 109.8 | 58.9 | 70.0 |
| Blow Back to Filter | 9.0 | 18.6 | 23.6 | 31.6 | 31.1 | 28.6 | 23.7 | 16.0 | 10.4 | 10.9 | 15.8 | 14.9 | 15.2 | 17.0 | 12.8 | 19.2 | 5.5 |
| Recycled Gas: Fresh Feed | .3 | .5 | 0 | .5 | 1.0 | .8 | .4 | .4 | .9 | 1.8 | 0 | 1.0 | 1.6 | .9 | 1.0 | 1.0 | .9 |
| Analysis—Gas Entering Bed, Mol Percent— | | | | | | | | | | | | | | | | | |
| Hydrogen | 60.6 | 56.5 | 59.7 | 58.1 | 55.2 | 54.1 | 59.0 | 59.5 | 56.2 | 50.4 | 68.3 | 52.3 | 38.5 | 50.3 | 46.8 | 49.1 | 54.1 |
| Carbon Monoxide | 24.1 | 24.1 | 35.0 | 22.7 | 18.7 | 21.0 | 25.1 | 23.6 | 19.8 | 14.9 | 25.3 | 19.0 | 19.6 | 24.2 | 26.9 | 18.3 | 16.5 |
| Carbon Dioxide | 7.4 | 9.3 | 1.1 | 9.0 | 13.1 | 11.9 | 7.6 | 6.8 | 11.2 | 13.7 | 2.9 | 12.5 | 22.1 | 11.9 | 14.8 | 12.4 | 8.3 |
| Hydrocarbons | 7.8 | 10.1 | 4.2 | 10.2 | 13.0 | 13.0 | 8.3 | 10.1 | 12.8 | 21.0 | 3.5 | 16.2 | 19.8 | 13.6 | 11.5 | 20.2 | 21.1 |
| $H_2$:CO—Gas Entering Bed | 2.5 | 2.3 | 1.7 | 2.6 | 2.9 | 2.6 | 2.3 | 2.5 | 2.8 | 3.4 | 2.7 | 2.8 | 2.0 | 2.1 | 1.7 | 2.7 | 3.3 |
| Fresh Feed— | | | | | | | | | | | | | | | | | |
| Total $H_2$ and CO, Mol Percent | 95.1 | 95.3 | 94.7 | 94.3 | 94.3 | 95.4 | 94.7 | 95.0 | 95.3 | 94.9 | 93.6 | 95.9 | 98.9 | 94.1 | 95.4 | 93.9 | 91.9 |
| $H_2$CO Ratio | 1.9 | 1.8 | 1.7 | 1.9 | 1.9 | 1.7 | 1.8 | 1.9 | 1.9 | 1.9 | 2.7 | 1.8 | 1.3 | 1.5 | 1.3 | 1.9 | 2.1 |
| Fresh Feed/Hr./Lb. Fe, s. c. f. | 11.9 | 14.9 | 21.6 | 21.7 | 18.6 | 19.9 | 16.3 | 16.3 | 18.4 | 13.6 | 33.1 | 39.0 | 32.6 | 51.3 | 33.6 | 27.2 | 27.7 |
| Total Gas/Hr./Lb. Fe, s. c. f. | 16.7 | 21.6 | 21.6 | 33.9 | 37.0 | 37.1 | 23.4 | 23.8 | 38.3 | 39.2 | 33.1 | 79.5 | 87.4 | 99.0 | 68.8 | 55.8 | 54.0 |
| CO in Total Gas Charge/Hr./Lb. Fe, s. c. f. | 4.0 | 5.2 | 7.6 | 7.7 | 7.1 | 7.8 | 5.8 | 5.6 | 7.6 | 5.9 | 8.4 | 15.1 | 17.2 | 24.0 | 18.5 | 10.2 | 8.9 |
| Yields (Based on Fresh Feed): | | | | | | | | | | | | | | | | | |
| Vol. Percent Contraction | 57.7 | 68.6 | 56.2 | 65.0 | 66.8 | 70.2 | 64.2 | 67.5 | 71.6 | 72.6 | 46.7 | 68.0 | 67.0 | 58.6 | 61.6 | 71.6 | 66.8 |
| $C_3$'s, cc./cu. meter | 30 | 26 | 33 | 35 | 36 | 43 | 36 | 34 | 32 | 38 | 30 | 43 | 35 | 34 | 42 | 33 | 35 |
| $C_4$'s, cc./cu. meter | 4 | 11 | 8 | 16 | 18 | 19 | 13 | 13 | 16 | 18 | 12 | 16 | 13 | 22 | 20 | 12 | 10 |
| $C_5$'s, cc./cu. meter | 39 | 16 | 14 | 18 | 12 | 21 | 15 | 20 | 13 | 11 | 8 | 5 | 20 | 10 | 14 | 22 | 15 |
| Light Naptha, cc./cu. meter | 29 | 35 | 23 | 35 | 6 | 3 | 37 | 33 | 29 | 28 | 33 | 23 | 15 | 34 | 25 | 28 | 25 |
| Heavy Oil, cc./cu. meter | 42 | 61 | 64 | 53 | 68 | 45 | 40 | 52 | 56 | 35 | 27 | 58 | 39 | 33 | 38 | 54 | 28 |
| Tot. Liq. Hydrocarbons, cc./cu. meter | 137 | 149 | 142 | 157 | 137 | 160 | 137 | 148 | 145 | 135 | 100 | 137 | 141 | 124 | 142 | 139 | 113 |

TABLE II—Continued

| | A | B | C | D | E | F | G | H | J | K | L | M | N | P | Q | R | S |
|---|---|---|---|---|---|---|---|---|---|---|---|---|---|---|---|---|---|
| Yields (Based on Fresh Feed)—Con. | | | | | | | | | | | | | | | | | |
| Oxygenated Compounds, cc./cu. meter | 14 | 14 | 13 | 17 | 18 | 16 | 12 | 14 | 18 | 20 | 11 | 15 | 11 | 13 | 13 | 14 | 14 |
| Total Liquid, cc./cu. meter | 151 | 163 | 155 | 174 | 155 | 176 | 149 | 162 | 163 | 155 | 111 | 152 | 152 | 137 | 155 | 153 | 127 |
| Water Produced, cc./cu. meter | 98 | 126 | 75 | 119 | 136 | 119 | 99 | 110 | 126 | 125 | 76 | 116 | 80 | 66 | 58 | 114 | 118 |
| Percent $H_2$ Disappearance (over-all or fresh feed basis) | 64.4 | 78.5 | 62.2 | 72.5 | 73.4 | 81.1 | 71.1 | 74.8 | 78.8 | 85.6 | 48.4 | 78.0 | 84.2 | 71.6 | 77.1 | 84.3 | 78.3 |
| Percent CO Disappearance (over-all or fresh feed basis) | 100 | 100 | 100 | 100 | 100 | 100 | 100 | 100 | 99.6 | 100 | 95.0 | 100 | 95.4 | 92.5 | 93.2 | 100 | 100 |
| $H_2$:CO Reaction Ratio | 1.24 | 1.42 | 1.06 | 1.35 | 1.31 | 1.41 | 1.30 | 1.43 | 1.50 | 1.67 | 1.38 | 1.37 | 1.13 | 1.13 | 1.12 | 1.59 | 1.68 |
| CO Distribution— | | | | | | | | | | | | | | | | | |
| Mol Percent to $CO_2$ | 27.1 | 24.9 | 32.1 | 19.3 | 20.3 | 21.3 | 22.9 | 23.9 | 21.7 | 19.8 | 23.0 | 27.3 | 34.2 | 33.0 | 31.8 | 21.5 | 18.9 |
| Mol Percent to $CH_4$ | 10.8 | 11.1 | 8.7 | 9.5 | 9.8 | 10.3 | 10.2 | 5.7 | 4.9 | 9.6 | 15.2 | 10.5 | 9.0 | 10.6 | 11.2 | 11.8 | 15.6 |
| Mol Percent to $C_2$'s | 6.6 | 4.7 | 6.6 | 8.5 | 9.2 | 8.3 | 9.1 | 8.7 | 8.4 | 10.6 | 11.3 | 9.1 | 8.4 | 8.8 | 9.0 | 9.3 | 10.5 |
| Mol Percent to $C_3$'s and heavier | 51.6 | 55.6 | 49.1 | 58.1 | 55.4 | 55.9 | 54.4 | 57.7 | 59.7 | 53.7 | 46.8 | 50.3 | 45.6 | 43.9 | 44.9 | 53.1 | 50.7 |
| Mol Percent to Oxygenated Comp'ds | 3.9 | 3.7 | 3.5 | 4.6 | 5.3 | 4.2 | 3.4 | 4.0 | 5.6 | 6.3 | 3.7 | 2.8 | 2.8 | 3.7 | 3.1 | 4.3 | 4.3 |
| Mol Percent to $C_5$'s and heavier | 42.0 | 44.8 | 37.7 | 42.6 | 37.5 | 39.5 | 38.3 | 42.2 | 43.7 | 34.9 | 29.8 | 32.1 | 32.8 | 26.8 | 28.4 | 38.6 | 33.5 |
| Mol Percent to $H_2O$ | 44.8 | 49.1 | 35.5 | 59.5 | 57.5 | 55.8 | 53.5 | 51.4 | 54.8 | 58.0 | 53.6 | 44.9 | 32.0 | 33.4 | 36.8 | 55.8 | 60.3 |
| Heavy Oil Inspections: | | | | | | | | | | | | | | | | | |
| Gravity, °A.P.I. | 53.5 | 55.5 | 57.2 | 58.0 | 57.9 | 57.9 | 55.3 | 56.9 | 56.4 | 58.1 | 59.9 | 63.6 | 57.2 | 54.6 | 54.8 | 63.1 | 59.2 |
| ASTM Distillation, °F.— | | | | | | | | | | | | | | | | | |
| I.B.P. | 131 | 114 | 106 | 110 | 105 | 105 | 116 | 116 | 117 | 118 | 113 | 94 | 107 | 112 | 114 | 97 | 108 |
| 5% | 187 | 158 | 152 | 145 | 144 | 144 | 174 | | 164 | 163 | | 119 | 140 | 176 | 154 | 128 | 152 |
| 10% | 209 | 182 | 164 | 167 | 164 | 164 | 194 | 195 | 191 | 183 | | 135 | 159 | 194 | 184 | 141 | 172 |
| 30% | 272 | 248 | 226 | 235 | 234 | 234 | 259 | 253 | 265 | 263 | 229 | 188 | 239 | 268 | 266 | 191 | 231 |
| 50% | 335 | 306 | 284 | 293 | 299 | 299 | 318 | 315 | 332 | 336 | 283 | 250 | 305 | 335 | 330 | 248 | 297 |
| 70% | 430 | 392 | 380 | 390 | 393 | 393 | 418 | 408 | 534 | 441 | 359 | 330 | 400 | 440 | 434 | 334 | 366 |
| 90% | 610 | 548 | 564 | 586 | 581 | 581 | 619 | 580 | 648 | 707 | 513 | 506 | 608 | 666 | 712 | 529 | 539 |
| 95% | 706 | 630 | 655 | crkd. | 702 | 702 | 700 | 688 | crkd. | crkd. | 633 | 618 | 726 | crkd. | crkd. | 667 | 659 |
| E.B.P. | 718 | 698 | 658 | | crkd. | crkd. | crkd. | 702 | | | 640 | 628 | crkd. | | | crkd. | 676 |
| Mol Percent Mono-olefins | 75.8 | 76.0 | 76.9 | 76.0 | 73.5 | 73.5 | 71.9 | 64.6 | 65.9 | 64.2 | 59.8 | 65.1 | 68.9 | 69.0 | 67.5 | 63.4 | 50.1 |
| Adsorber Naphtha Inspections: | | | | | | | | | | | | | | | | | |
| Gravity, °A.P.I. | 76.9 | 79.6 | 82.0 | 78.7 | 70.4 | 76.6 | 79.4 | (81.0) | 79.8 | 78.9 | 80.2 | 80.8 | 76.3 | 75.4 | 76.9 | 74.7 | 78.8 |
| ASTM Distillation, °F.— | | | | | | | | | | | | | | | | | |
| I.B.P. | 89 | 87 | 82 | 86 | 114 | 86 | 87 | 82 | 89 | 92 | 89 | 94 | 90 | 94 | 92 | 93 | 90 |
| 5% | 109 | 100 | 92 | 98 | 144 | 104 | 97 | 95 | 101 | 104 | 101 | 105 | 104 | 112 | 107 | 106 | 102 |
| 10% | 116 | 105 | 94 | 108 | 156 | 110 | 101 | 98 | 107 | 111 | 105 | 108 | 110 | 118 | 113 | 113 | 107 |
| 30% | 136 | 118 | 103 | 124 | 179 | 130 | 113 | 110 | 121 | 126 | 117 | 117 | 129 | 135 | 128 | 138 | 121 |
| 50% | 156 | 133 | 115 | 142 | 202 | 152 | 134 | 122 | 136 | 145 | 132 | 127 | 153 | 156 | 146 | 173 | 138 |
| 70% | 181 | 156 | 136 | 169 | 227 | 184 | 165 | 145 | 159 | 171 | 160 | 145 | 171 | 183 | 175 | 223 | 166 |
| 90% | 219 | 202 | 188 | 218 | 255 | 242 | 228 | 203 | 207 | 215 | 221 | 197 | 253 | 238 | 240 | 275 | 230 |
| 95% | 235 | 228 | 225 | 241 | 265 | 264 | 238 | 244 | 243 | 241 | 255 | 243 | 291 | 276 | 284 | 311 | 276 |
| E.B.P. | 258 | 256 | 252 | 280 | 316 | 292 | 290 | 274 | 274 | 278 | 284 | 280 | 325 | 334 | 338 | 357 | 334 |
| Reid Vapor Pressure, p.s.i. | 12.6 | 15.6 | 17.6 | 13.2 | 6.6 | 12.9 | 15.0 | 16.8 | 13.7 | 13.0 | 13.8 | 13.8 | 12.4 | 10.1 | 13.1 | 11.8 | 14.4 |
| Mol Percent Mono-olefins | 77.0 | 78.1 | 78.8 | 75.4 | 64.0 | 75.6 | 77.2 | 73.8 | 72.3 | 70.4 | 66.9 | (74) | 72.8 | 72.2 | 63.4 | 68.3 | 64.5 |
| Hours On Condition | 43 | 48 | 44 | 46 | 24 | 48 | 68 | 48 | 72 | 60 | 52 | 34 | 48 | 24 | 24 | 18 | 51 |
| Total Operating Hours | 100 | 152 | 196 | 242 | 266 | 314 | 382 | 447 | 519 | 579 | 679 | 726 | 828 | 940 | 988 | 1,062 | 1,114 |

The data in Table II are arranged to present the results observed in 17 periods of stabilized operation during the operating run. Throughout this operating run the fresh feed to the operation contained hydrogen and CO in ratios varying from 1.3:1 to 2.7:1. In most of the periods of stabilized operation presented in Table II sufficient unconverted gas was recycled to increase the $H_2$:CO ratio in the gas entering the catalyst bed substantially above the corresponding figure in the fresh feed. In the recycling operations the $H_2$:CO ratio in gas entering the catalyst bed varied from 1.7:1 to 3.4:1. In most cases no unconverted CO was observed in the product mixture when operating even at relatively high space velocities. For example, at a charge rate as high as 15.1 cubic feet of carbon monoxide per hour per pound of iron complete disappearance of the CO was observed. At the maximum charging rate employed, 24.0 cubic feet of CO per hour per pound of iron, only 28 per cent of the CO charged to the reactor was observed in the product mixture. This occurred in period P, during which time the total gas charge entering the bed was introduced at the rate of 99.0 cubic feet per hour per pound of iron. This corresponded to a space velocity of 1,915 volumes of gas entering the catalyst bed per hour per cubic foot of dense catalyst phase.

During the operating run of Table II the quantity of iron catalyst in the reactor was reduced periodically during the operation in order to obtain samples for analysis, and in order to reduce the volume of the catalyst mass in the reactor. The accumulation of carbonaceous deposits on the catalyst particles increased the volume of the catalyst in the reactor as the operation proceeded so that the upper level of the dense phase rose to over 14 feet above pipe 3 to a level in manifold 6. In order to maintain all of the dense phase in reactor 11 proper, and in order to permit operation at relatively high space velocities, the quantity of iron catalyst in the reactor was progressively reduced whereby the amount of iron catalyst in the dense phase decreased from about 16 pounds in period A to about 5 pounds in period S. The catalyst density decreased from an initial figure of over 80 pounds per cubic foot to about 40 pounds in period P. The density also was affected by changes in the velocity of the gases passing through the reactor.

During the operation of Table II the flow of the reaction mixture out of the reactor was alternated between filter 9 and filter 10 every 15 minutes, and the off-stream filter was blown back with feed gas at the rates indicated in Table II.

The reaction products were recovered during the operation of Table II by cooling the reaction mixture to room temperature, or lower, to obtain a condensate and then passing the remaining gas through an adsorbent. Heavy oil and water product fractions were obtained from the condensate. The heavy oil fraction contained, in addition, oxygenated compounds, such as butyl, amyl, hexyl and heptyl alcohols. The water product fraction contained substantial amounts of oxygenated compounds, such as ethyl, propyl and butyl alcohol, acetone and methyl ethyl ketone. The adsorbed product was recovered by steam distillation, which produced a light naphtha fraction condensate water and a gas fraction. The condensate water yielded additional oxygenated compounds. The gas fraction was almost entirely hydrocarbons having 3, 4 or 5 carbon atoms per molecule. The amounts of other compounds in the reaction product mixture was determined by absorption, combustion and mass spectrometry.

Forty-one hours after synthesis gas was introduced to the system hydrogen was added for a short period of time to dilute the synthesis gas and improve the general operation. Just before the addition of hydrogen the maximum temperature in the catalyst bed was on the order of 690° F. After period G of the operation of Table II the feed to the operation was changed to substantially pure hydrogen. At the same time the "Dowtherm" was removed from jacket 13 and the reaction chamber was heated by means of the external heating coils to a higher temperature to effect reduction of the catalyst by means of the hydrogen. In this operation the hydrogen was passed through the reactor at flow rates varying from 18 to 37 cubic feet per hour and the temperature of the catalyst was raised in about 6 hours to an average temperature of approximately 930° F. This condition was maintained, with a maximum catalyst temperature of 972° F., for approximately 10 hours, after which time the temperature of the catalyst was reduced in 7 more hours to approximately 430° F. The temperature was subsequently raised to about 500–550° F. and maintained for a short time.

The pressure during the hydrogen treatment was held at atmospheric for 27 hours with hydrogen once through, then it was raised to 150 pounds per square inch and then hydrogen recirculation was started. The following hydrogen rates entering the reactor were used:

| Pressure | Hydrogen | Rate |
| --- | --- | --- |
| 1 Atmosphere | Once-through | 9–37 Std. cu. ft./hr. |
| 150 #/sq. in | do | 20–65 Std. cu. ft./hr. |
| 150 #/sq. in | Recycling | 60–500 Std. cu. ft./hr. |

The total length of hydrogen treatment was 40 hours. Thereafter, the feed to the reactor was changed to the synthesis gas mixture and the conversion reaction was resumed. Prior to this reduction treatment of the catalyst the contact mass contained 0.195 pound of carbon, 0.268 pound of oxygen, and 0.091 pound of oil and wax, per pound of iron. After the treatment the contact mass contained 0.170 pound of carbon, 0.070 pound of oxygen, and 0.001 pound of oil and wax, per pound of iron.

After this reduction treatment of the catalyst and after a short period of variable conditions period H of the operating run was started. The improvement in activity of the catalyst following the reduction treatment is shown by a comparison of the data of periods G and H, which show that a lower temperature after reduction provided the same rate of conversion of carbon monoxide as was reached previously at a higher temperature. These data show also an improved yield of oil and reduced production of hydrocarbon gases.

Most of the operating periods of the operating run of Table II involved recycling of unconverted gas at ratios of recycled gas to fresh feed varying from .3:1.0 to 1.8:1.4. The recycling operations ordinarily involved relatively high $H_2$:CO ratios in the gas entering the catalyst bed. However, the data indicate that, other conditions being equal, and at the same $H_2$:CO ratio, the operating runs under recycling conditions produced substantially more oil per unit quantity of fresh feed.

One of the beneficial effects of recycling lies in the great improvement in the selectivity of the synthesis reaction. This point is clearly demonstrated by comparison of periods selected after 828 and 1114 hours of operation. Recycling was employed in each case; however, in the former period the $H_2$:CO ratio entering the reactors was 2.0 and in the latter case, 3.3. A few salient features of each of these tests are listed below:

| Test Designation | N | S |
| --- | --- | --- |
| Hours on Operation | 828 | 1,114 |
| Pressure, #/sq. in | 250 | 250 |
| Fresh Feed/Hr./Lb. Fe | 32.6 | 27.2 |
| $H_2$:CO—Gas Entering Bed | 2.0 | 3.3 |
| CO Distribution: | | |
| Percent to $CO_2$ | 34.2 | 18.9 |
| Percent to $CH_4$ and $C_2$'s | 17.4 | 26.1 |
| Total | 51.6 | 45.0 |

Thus the conversion to carbon dioxide, methane, ethlene, and ethane was materially lower at Condition S than at Condition N.

In the 250 p. s. i. g. runs D, E, F, J, K, R and S of Table II, a major proportion of the oxygen of the carbon monoxide reactant was converted to water and a minor proportion to carbon dioxide. In these 250 p. s. i. g. runs the minimum space velocity was about 6 standard cubic feet of carbon monoxide and about 34 standard cubic feet of total feed gas, per hour, per pound of catalyst. The minimum carbon dioxide content of the total feed was 8 volume per cent and the minimum $H_2$:CO ratio in the inlet gas was 2.5.

In runs C and L of Table II, no recycle was effected. In runs A, B, C, G, H, and L, the pressure was about 150 pounds per square inch gage or lower. It should be noted that in all of the runs of Table I, no recycle and low pressures were employed. In runs B, C, N, P and Q of Table II, the low water production was attributed, at least in part, to the low $H_2$:CO ratio in the inlet gas. Generally, the use of low pressures resulted in low throughputs. The runs without recycle resulted in most instances in low $H_2$:CO ratios and low concentrations of $CO_2$ in the reaction zone.

In the runs of Table II in which a major proportion of the oxygen of the carbon monoxide was converted to water, the reaction mol ratio of hydrogen to carbon monoxide was at least 1.3.

Varying amounts of hydrocarbons and oxygenated chemicals were recycled with the fresh feed to the synthesis reactor. The recycle stream was taken after the product gas had passed through the secondary receiver which was ordinarily maintained, during the recycling tests, at approximately 40° F. and reaction pressure. During some of these operations the recycle gas was passed through the charcoal adsorber and stripped of the oxygenated compounds present and of all but the very lightest hydrocarbons. In other operations the stream was not adsorbed and contained light oxygenated materials and hydrocarbons, predominantly olefins, through $C_{10}$. The recycle stream was taken just after the secondary receiver and after passing through or by-passing the adsorbers the pressure was released and the gas fed to the suction of the synthesis compressor. When the recycle was passing through the adsorber the product gas was merely vented to the atmosphere after metering and sampling whereas during a number of the operations where the recycle was not adsorbed the adsorber was on the product stream. When conditions A, B, D, F, G, H, J, P and Q were obtained the recycle gas was taken after passage over activated carbon, and when conditions K and S were obtained the recycle was passed over activated carbon for the greater part of the tests.

At the beginning of the operating run of Table II the reactor was filled with catalyst to a catalyst bed height of about 10 feet above pipe 3. At an average superficial velocity of about 0.76 feet per second the dense phase had, in the lower portion thereof, a density of about 83 pounds per cubic foot. As the operation proceeded the iron became partially oxidized and the catalyst also accumulated carbon and deposits of oil and wax. After 586 hours operation a sample of the catalyst was withdrawn and aerated with inert gas at 1.2 feet per second. The catalyst density was 45.0 pounds per cubic foot. A similar test at 1166 hours indicated a density of 41.5 pounds per cubic foot. Changes in the composition of the catalyst during the run are indicated below in the table headed "Catalyst Composition."

*Catalyst composition*

| | | | | | | | | | |
|---|---|---|---|---|---|---|---|---|---|
| Total Hours On Stream | 0 | 245 | 383 | 383 | 445 | 586 | 940 | 1,114 | 1,166 |
| Hours After H₂ Treat | | | | 0 | 62 | 203 | 560 | 728 | 780 |
| Catalyst Analysis: | | | | | | | | | |
| Carbon, Wt. Percent | 0 | 12.4 | 12.4 | 13.4 | 15.1 | 13.6 | 18.3 | 20.9 | 23.2 |
| Oil+Wax | 0 | 4.1 | 5.8 | 0.1 | 1.8 | 8.0 | 18.9 | 18.6 | 15.6 |
| Fe | 93 | 63.8 | 63.7 | 79.1 | 67.1 | 59.8 | 47.4 | 45.0 | 46.5 |
| Al₂O₃ | 4 | | | | | | | | |
| K₂O | 0.5 | | | | | | | | |
| Iron Distribution: | | | | | | | | | |
| Oil, Wax and C Free— | | | | | | | | | |
| Fe | 89.1 | 37.2 | | | | | | | 46.0 |
| Fe Oxides | 5.0 | 57.1 | | | | | | | 37.0 |
| Lbs. C./100 Lbs. Fe | 0 | 19.4 | 19.5 | 16.9 | 22.5 | 22.7 | 38.6 | 46.5 | 50.0 |
| Lbs. Cat./100 Lbs. Fe | 107 | 157 | 157 | 126 | 149 | 167 | 211 | 222 | 215 |

The effect of the intermediate hydrogenation treatment of the catalyst is indicated in the two columns at 383 hours on stream. The specific effect of this treatment on the various ingredients of the catalyst has been indicated above. The over-all effect can be seen in the foregoing table in the reduction of the weight of catalyst per 100 pounds of iron from 157 to 126.

Oxygenated chemicals were recovered from synthol oil produced at 250 pounds per square inch by means of the following procedure. The oil product was first caustic-washed to remove organic acids and subsequently treated with a solvent to obtain the remaining oxy-chemicals. The condensed oil fraction subjected to the extraction step was found to contain 6.25 weight per cent of oxygenated chemicals. Since a small amount of carbonyl compounds—aldehydes and ketones—was produced, this extract material was hydrogenated and then redistilled. The distillation indicated a distribution of alcohols in the hydrogenated extract from the oil shown below.

| | Percent |
|---|---|
| Ethyl alcohol | 8 |
| Propyl alcohol | 9 |
| Butyl alcohol | 13 |
| Amyl alcohol | 22 |
| Hexyl alcohol | 22 |
| Heptyl alcohol | 13 |
| Higher alcohols | 13 |

The alcohols produced in this operation were principally straight chain.

A breakdown of the principal acid-free oxy-chemicals from this operation, including those chemicals recovered in the water product, is presented in the following tabulation:

| | Volume percent |
|---|---|
| Acetone | 8.6 |
| Methyl ethyl ketone | 5.7 |
| Ethyl alcohol | 46.9 |
| Propyl alcohol | 26.8 |
| Butyl alcohol | 8.3 |
| Amyl alcohol | 1.4 |
| Hexyl alcohol | 1.4 |
| Heptyl and higher alcohols | 0.9 |
| Total | 100.0 |

A small amount of carbonyl compounds recovered with the synthol oil has not been included.

EXAMPLE III

This example was a stabilized period of operation in a relatively long operating run carried out in the reactor whose construction and operation are similar to that shown in the drawing and described in Example I. The catalyst, employed in a finely divided condition, consisted principally of iron and contained 0.70 weight per cent $K_2O$. The average operating temperature in the reactor during this operating period was 551° F. The fresh feed to the operation was 90 per cent $H_2$ and CO, the remainder being $CO_2$, $N_2$ and hydrocarbon gases. In the fresh feed the $H_2$:CO ratio was 2:1. The fresh feed was charged to the operation at the rate of 3.8 standard cubic feet per hour per pound of the original reduced catalyst present in the reactor. The tail gas from the operation was recycled to the reaction zone in a ratio of recycled gas to fresh feed of 5.2:1. As the result of recycle the average space velocity was equivalent to at least 5 standard cubic feet of CO, per hour, per pound of catalyst. During the operation nearly all the CO was converted to products other than $CO_2$, a major proportion being converted to water. Consequently, the $H_2$:CO ratio in the total charge gas was 5:1 to 10:1, and the charge gas contained at least 6 mol per cent carbon dioxide.

Under these conditions of operation the total liquid hydrocarbon production (including oil-soluble organic compounds) equaled 104 cc. per cubic meter of fresh feed gas. This product was obtained by condensation at ice-water temperature and 250 pounds per square inch. This product had an A. P. I. gravity of 56.1 and contained 69.8 mol per cent mono-olefins. At the same time the production of water (including water-soluble organic compounds) equaled 198 cc. per cubic meter of fresh feed gas. The size of the water production indicated clearly that the oxygen eliminated from the system, in forms other than organic compounds, was being eliminated largely as $H_2O$, rather than $CO_2$.

EXAMPLE IV

This was a period of a relatively long operating run carried out in a reactor generally similar to the reactor employed in Example I and under generally similar conditions. The finely divided iron catalyst contained, per part of iron, 0.01 part $Al_2O_3$, 0.011 part $TiO_2$, 0.008 part $SiO_2$, and 0.014 part $K_2O$. In this operating period the temperature varied from 610° F. near the inlet to 597° F. near the outlet, and a pressure of 250 pounds was maintained on the reactor. Fresh feed was charged to the operation at the rate of 45.3 cubic feet per hour per pound of iron in the catalyst in the reactor. Tail gas was recycled to the operation in a ratio of recycled gas to fresh feed of 2.8:1. The fresh feed gas contained 75.2 mol per cent $H_2$ and 18.8 per cent CO, the remainder being $CO_2$ and hydrocarbon. The total gas charge, including fresh feed and recycled gas, contained 75.1 mol per cent $H_2$ and 11.4 mol per cent CO, the remainder being substantially all $CO_2$ and less than 4 mol per cent light hydrocarbon gases. Under these conditions 74.7 per cent of the CO was reacted, including 2.3 per cent converted to $CO_2$. This operation produced total liquid hydrocarbons to the extent of 63 cc. per cubic meter of fresh feed gas and 21 cc. of oxygenated compounds per cubic meter of fresh feed gas.

The selectivity of the operation was excellent when these conditions were employed, e. g., 66.5 per cent of the carbon monoxide when reacted was converted to oil (propylene and higher hydrocarbons) and oxygenated chemicals, and only 3.3 per cent of the reacted carbon monoxide was converted to carbon dioxide. In spite of the greater hydrogenating activity of the catalyst as a result of the relatively high concentration of hydrogen in the reaction zone the $C_2$ fraction 86 per cent propylene, and the $C_4$ fraction 84 per cent butylenes. The oil which was condensed from the reactor effluent at ice-water temperature and operating pressure contained nearly 30 per cent oxygenated chemicals, largely alcohols and acids.

Having described our invention, we claim:

In a process for the hydrogenation of carbon monoxide in which a gaseous reaction mixture comprising hydrogen and carbon monoxide is passed through a reaction zone containing a finely divided iron catalyst at a velocity effective to suspend said catalyst in said gaseous mixture in said reaction zone under conditions such that hydrogen and carbon monoxide are reacted to produce organic compounds as products of the process, the improvement during the synthesis proper which comprises introducing into said reaction zone a fresh feed gas containing hydrogen and carbon monoxide in a mol ratio in excess of the mol ratio in which these components are reacted and containing a relatively small amount of carbon dioxide, passing the gaseous reaction mixture through said reaction zone at a rate equivalent to at least 30 standard cubic feet of total gas and between about 4 and about 15 standard cubic feet of carbon monoxide, per hour per pound of iron catalyst in the reaction zone, maintaining a temperature of reaction between about 550° F. and about 750° F., a reaction pressure between about 150 and about 600 pounds per square inch gage and a contact time between the reaction mixture and catalyst in the reaction zone of between about 8 and about 35 seconds, converting over-all a major proportion of the hydrogen and carbon monoxide in a mol ratio of at least 1.3 to products of reaction comprising organic compounds having at least one carbon atom per molecule and water, whereby under the conditions of operation a major proportion of the oxygen of the carbon monoxide is converted to water and not more than a minor proportion is converted to carbon dioxide, withdrawing a gaseous effluent from said reaction zone, cooling said gaseous effluent to condense water, separating condensate comprising water from an uncondensed portion of said effluent comprising hydrogen and carbon dioxide, and recycling said uncondensed portion of said effluent comprising hydrogen and carbon dioxide to the inlet of said reaction zone in a volumetric ratio of recycle gas to fresh feed gas of between about 0.5:1 and about 5:1 such that the total feed gas to said reaction zone contains hydrogen and carbon monoxide in a mol ratio greater than 2.3:1 and between about 6 and about 14 mol per cent carbon dioxide, the carbon dioxide concentration of the total feed being more than in the fresh feed.

References Cited in the file of this patent

UNITED STATES PATENTS

| | | |
|---|---|---|
| 2,251,554 | Sabel et al. | Aug. 5, 1941 |
| 2,360,787 | Murphree et al. | Oct. 17, 1944 |
| 2,486,895 | Watson | Nov. 1, 1949 |
| 2,614,114 | Krebs | Oct. 14, 1952 |
| 2,631,159 | Keith | Mar. 10, 1953 |